United States Patent [19]
Waltz

[11] Patent Number: 5,283,708
[45] Date of Patent: Feb. 1, 1994

[54] OVERLOAD CURRENT PROTECTION APPARATUS

[75] Inventor: Richard W. Waltz, Milwaukee, Wis.

[73] Assignee: Allen-Bradley Company, Inc., Milwaukee, Wis.

[21] Appl. No.: 950,984

[22] Filed: Sep. 23, 1992

Related U.S. Application Data

[63] Continuation of Ser. No. 589,154, Sep. 27, 1990, abandoned.

[51] Int. Cl.$^5$ ............................................. H02H 7/08
[52] U.S. Cl. ....................................... 361/93; 361/24; 361/103
[58] Field of Search ..................... 361/93, 91, 96, 97, 361/42, 45, 98, 103, 24, 25

[56] References Cited

U.S. PATENT DOCUMENTS

| | | | |
|---|---|---|---|
| 4,213,165 | 7/1980 | Zylstra et al. | 361/94 |
| 4,271,447 | 6/1981 | Howell | 361/93 |
| 4,337,837 | 3/1983 | Matsko et al. | 361/105 |
| 4,423,459 | 12/1983 | Stich et al. | 361/94 |
| 4,428,021 | 1/1984 | Chen et al. | 361/94 |
| 4,685,022 | 8/1987 | Nichols, III et al. | 361/44 |
| 4,689,712 | 8/1987 | Demeyer | 361/96 |
| 4,703,389 | 10/1987 | Scott | 361/93 |
| 5,057,962 | 10/1991 | Alley et al. | 361/24 |

OTHER PUBLICATIONS

Pages 2, 10 and 11 from an Allen-Bradley catalog entitled *IEC Contactors*, Overload Relays & Enclosed Starters.

The Allen-Bradley Product Data Bulletin for the 100 Line of Contactors and overload relays.

*Primary Examiner*—A. D. Pellinen
*Assistant Examiner*—S. Jackson
*Attorney, Agent, or Firm*—Quarles & Brady

[57] ABSTRACT

A device protects an electric load, such as a motor, from excessive current levels. The current flows from a source to the load through a switch and a primary winding of a current sensing transformer. The voltage across a secondary winding of the current sensing transformer is rectified to produce a voltage which is measured to determine the level of current through the load. The voltage across the secondary winding also powers components of the device. In a first mode of operation, current from the secondary winding is applied to charge a power supply capacitor. In a second mode of operation the level of the rectified voltage is sensed to produce a sample of the level of the current flowing through the load. From this sample the change in temperature of the load since a previous sample is calculated and used to derive the present load temperature. When the present load temperature exceeds a defined threshold level, the switch is opened to disconnect the load from the electricity source.

7 Claims, 5 Drawing Sheets

OVERLOAD CURRENT PROTECTION APPARATUS

This application is a continuation of application Ser. No. 07/589,154, filed Sep. 27, 1990.

BACKGROUND OF THE INVENTION

The present invention relates to devices which sense the magnitude of electrical current flowing through a conductor and cut off the flow of electricity when the current magnitude exceeds a given threshold, and more particularly to such devices which are capable of controlling the supply of electricity to a motor.

Large three-phase motors often are coupled to electricity supply lines by contactors which close and open to turn on and off the motor. The contactor, such as the one described in U.S. Pat. No. 3,536,868, in essence is a relay which is capable of switching large three-phase electric currents. In a simple installation, the contactor is operated by a signal applied to its control input by the operator opening or closing an electric switch. Thus, a large magnitude current to the motor can be controlled by switching a relatively small magnitude electric current to the control input.

As a safety feature, it is often desirable to include a mechanism which can detect when the current flowing through the contactor exceeds a safety threshold, and respond by disabling the contactor to cut off the flow of electricity to the motor. Such a device is commonly referred to as an overload relay. Previously this overload protection was provided by passing some or all of the motor current through a set of bi-metallic switch elements. The current flow heated bi-metallic material of the switch by an amount that corresponded to the magnitude of the current. When the motor current exceeded the safety threshold for a defined period of time, the heat caused the bi-metallic material to bend opening the switch contacts and terminating the application of current to the control input of the contactor. The level of current at which the bi-metallic switches open was difficult to calibrate and tended to become miscalibrated over time.

With the advent of solid state circuits, it became possible to incorporate an electronic sensing and control mechanism to perform the overload protection previously performed by the bi-metallic switching. The use of electronics provided a more reliable device and one that was easier to calibrate. However, such circuits often became relatively complex requiring low voltage power supplies and numerous components to adequately sense the electricity and activate the contactor mechanism.

SUMMARY OF THE INVENTION

An protection apparatus responds to an overload level of current flowing to a load by disconnecting the load from its source of power. To do so, the load is coupled to the source by a switch and a current sensing transformer in each electrical phase connected to the load. The apparatus periodically senses a first voltage at an output of a storage device in its power supply. If this sensed voltage is below a given level, current from a secondary winding of the current sensing transformer is applied to the storage device to restore the output voltage level.

The apparatus also periodically senses a second voltage produced from the current sensing transformer to provide an indication of the level of current flowing to the load. From the second sensed voltage, a calculation is made of the change in temperature of the load due to the current flow since a previous current level sensing. The change in temperature then updates a value that represents the present temperature of the load. When the value representing the present temperature of the load exceeds a given reference level, the switch is opened to disconnect the load from the source of power.

In the preferred embodiment, after each calculation of a change in the load temperature, the value of a thermal memory is checked to insure that it represents the present load temperature. For example, the memory may comprise a capacitor the voltage across which represents the present load temperature. The capacitor is part of an RC network having a time constant defined so that the voltage across the capacitor will decay proportionally to the cooling of the load when power is disconnected. A control circuit selectively couples the power supply to the capacitor to insure that the capacitor is charged to a level corresponding to the present temperature of the motor.

When the apparatus closes the switch to apply electricity to the load, the control circuit senses the voltage across the capacitor to derive an initial value of the load temperature.

A general object of the present invention is to provide an apparatus that protects a load against adverse effects of an overload current.

A more specific object is to incorporate the functional characteristics of a conventional bi-metallic overload relay in the apparatus.

Another object of the present invention is to provide a mechanism that disconnects the load from its electricity source depending on the interval of time that an overload current condition exists. The interval of time being an inverse function of the magnitude of the overload current.

A further object is to provide a means for calculating the temperature of the load from the magnitude of the current flowing through the load and disconnecting the load from its electricity source when the temperature exceeds a defined level.

Yet another object is to provide a thermal memory which tracks the temperature decrease of the load following a disconnection due to an overload condition. Such a thermal memory provides an indication of the load temperature upon the reapplication of electricity following an overload.

DETAILED DESCRIPTION OF THE INVENTION

Figure 1:
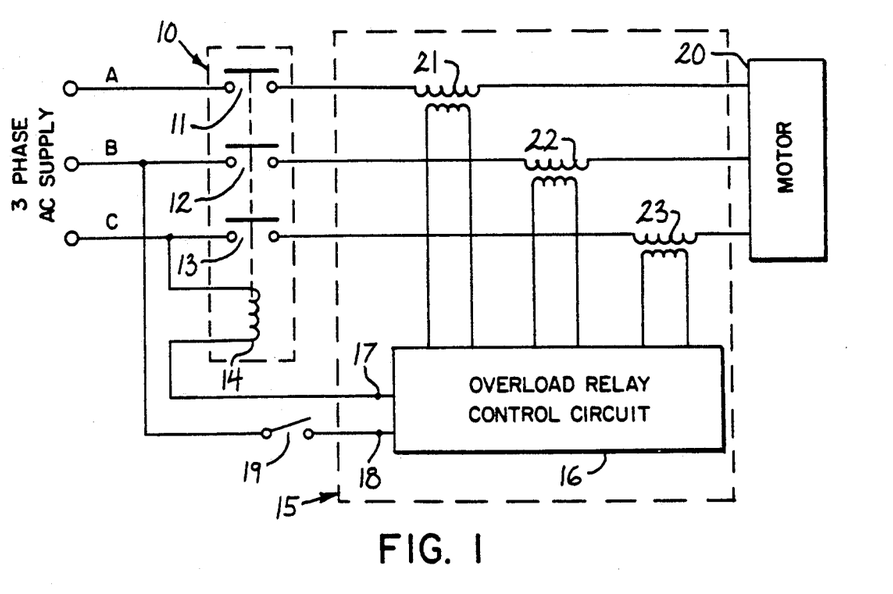
FIG. 1 is a block diagram of a contactor and an overload relay connecting to supply lines to a three-phase motor.

With initial reference to FIG. 1, three supply lines designated A, B and C are coupled to a source of three-phase alternating electricity (not shown). The supply lines are connected to a motor 20 by a three-phase contactor 10 and a trio of current sensing transformers 21, 22 and 23. The contactor 10 has a three sets of contacts 11, 12 and 13, each coupling a different supply line A, B or C, to the motor 20 through a primary winding of a separate current sensing transformer 21, 22 or 23, respectfully. The sets of contacts are mechanically coupled to be activated in unison by an electromagnet coil 14. One end of the coil 14 is connected to the C supply line and the other end is connected to terminal 17 of a control circuit 16.

The current sensing transformers 21, 22 and 23 and the control circuit 16 form a solid state overload relay 15. Another terminal 18 of the control circuit is connected by a switch 19 to the B supply line. In addition, the secondary winding of each of the current sensing transformers 21-23 is connected to the control circuit 16. The turns ratio of each current sensing transformer 21-23 is selected to apply a compatible current level to the control circuit 16.

As will be described in greater detail, electricity is applied to the motor 20 by closing switch 19 which applies current through normally closed relay contacts within the control circuit 16 to terminal 17 and through the contactor coil 14. When that coil 14 is energized, a magnetic field is created which closes each set of contacts 11-13 connecting the supply lines A, B and C to the motor 20. This application of electricity also powers the control circuit 16 which senses the magnitude of the current flowing to the motor. Should the current in the supply lines A, B or C exceed a predetermined maximum level, the control circuit 16 opens its relay contacts thereby deenergizing the contactor coil 14 and opening the sets of contacts 11-13.

Figure 2:
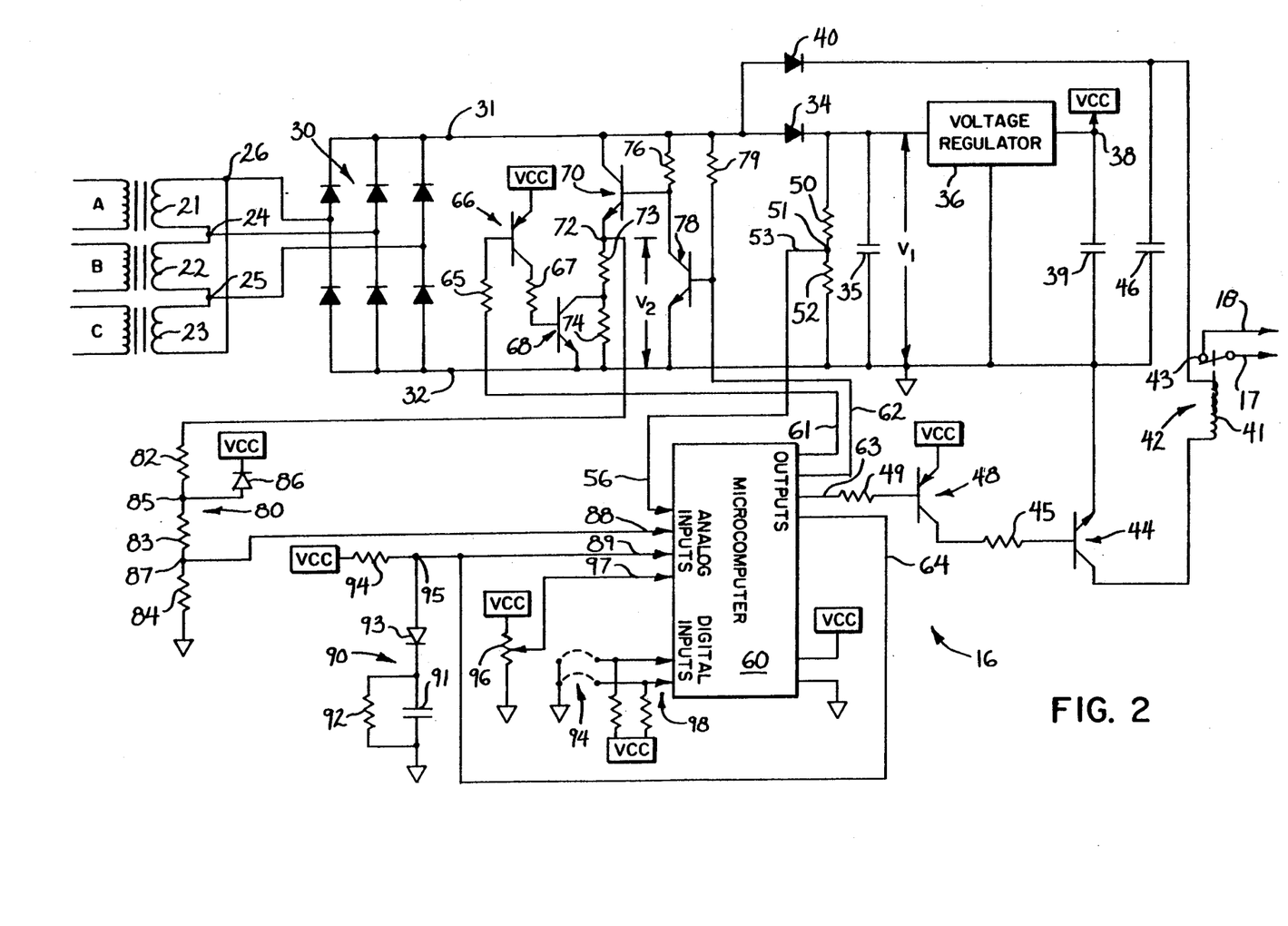
FIG. 2 is a schematic diagram of the details of the overload relay control circuit.

FIG. 2 illustrates the details of the overload control circuit 16. The secondary windings of each of the current sensing transformers 21, 22 and 23 are connected in a series loop which defines three nodes 24, 25 and 26 between each pair of the serially coupled windings. Each of the nodes 24-26 is connected to the intermediate nodes of a three-phase rectifier bridge 30 having a positive output terminal 31 and a negative output terminal 32, which forms the circuit ground for the control circuit 16. The positive terminal 31 is connected by a first diode 34 to the positive input of a voltage regulator 36 which has a reference input connected to the circuit ground at terminal 32. A first storage capacitor 35 is coupled between the positive input of the voltage regulator 36 and circuit ground to provide a relatively constant voltage level to the regulator input. The output terminal 38 of the voltage regulator 36 provides the positive supply voltage Vcc for the control circuit 16. A filter capacitor 39 is coupled between the voltage regulator output terminal 38 and circuit ground.

The positive terminal 31 of the rectifier bridge 30 also is coupled by a second diode 40 to one end of coil 41 of an output relay 42. A second storage capacitor 46 is connected between the one end of the relay coil 41 and circuit ground. Output relay 42 has normally closed switch contacts 43 connected between input lines 17 and 18 to the control circuit 16. The other end of the relay coil 41 is connected by the collector-emitter conduction path of a first transistor 44 to circuit ground. The base of the first transistor 44 is coupled by a resistor 45 and the collector-emitter conduction path of a second transistor 48 to the positive supply voltage VCC. The base of the second transistor 48 is connected by another resistor 49 to a digital output 63 of the microcomputer 60.

Microcomputer 60 contains a conventional microprocessor, a read only memory which stores a computer program defining the operation of the control circuit 16, and a random access memory for storage of different variables used in the execution of that program. The execution of the program within the microcomputer will be described in detail subsequently with respect to the operation of the entire control circuit 16. In addition, the microcomputer 60 has four analog inputs and circuitry connected thereto for digitizing the analog signals applied to the inputs. Both digital inputs 98 and digital outputs 61-64 are also provided on the microcomputer.

As noted above, the first storage capacitor 35 provides a voltage level $V_1$ at the input to voltage regulator 36. The voltage $V_1$ across the first storage capacitor 35 also is applied across a first voltage divider formed by series coupled resistors 50 and 52. A connection 53 couples the intermediate node 51 of the first voltage divider to a first analog input 56 of the microcomputer 60 allowing the latter component to sense a voltage that is proportional to the voltage $V_1$ across storage capacitor 35.

A first digital output 61 of the microcomputer 60 is connected via a resistor 65 to the base of a third transistor 66. The emitter of the third transistor 66 is coupled to the regulated, positive supply voltage Vcc and the collector is coupled via a resistor 67 to the base of a fourth transistor 68. The emitter of the fourth transistor 68 is directly connected to the circuit ground. The voltage level applied to the base of the third transistor 66 controls the conductivity of the fourth transistor 68.

A fifth transistor 70 has its collector-emitter conduction path connected between the positive terminal 31 and a node 72. A pair of resistors 73 and 74 are connected in series between node 72 and circuit ground, with the collector of the fourth transistor 68 being connected directly to the intermediate node between these two resistors 73 and 74. The values of resistors 73 and 74 are chosen so that resistor 73 is one-eighth the sum of the resistance of resistors 73 and 74. When the fourth transistor 68 is in a conductive state, a relatively low resistance shunt path is formed bypassing resistor 74.

Resistor 76 has a first terminal connected to the positive terminal 31 of rectifier bridge 30, and a second terminal connected directly to the base of fifth transistor 70. The second terminal of resistor 76 is connected to circuit ground by the collector-emitter conduction path of a sixth transistor 78. The base of the sixth transistor 78 is connected to a second output line 62 from microcomputer 60 and to the positive output terminal 31 of rectifier bridge 30 by a resistor 79.

Node 72 also is connected to network 80 at one end of a second voltage divider formed by the serial connection of resistors 82, 83 and 84. The other end of the second voltage divider is connected to the circuit ground. Node 85 between resistors 82 and 83 is connected to the anode of a third diode 86 whose cathode is connected to the regulated, positive supply voltage Vcc. Another node 87, formed in the second voltage divider between resistors 83 and 87, is connected directly to a second analog input 88 of microcomputer 60.

The control circuit 16 also contains a thermal memory circuit 90 which stores a voltage level indicative of the temperature of the motor being controlled. The thermal memory circuit 90 includes resistors 92 and 94, capacitor 91 and a fourth diode 93. The cathode of the fourth diode 93 is coupled to ground by the parallel connection of resistor 92 and capacitor 91. The anode of diode 93 is connected at node 95 to both a third analog input 89 and digital output 64 of the microcomputer 60. Pull-up resistor 94 couples node 95 to the positive supply voltage Vcc. As will be described in the course of explaining the operation of the control circuit, the microcomputer 60 via its connection to node 95 controls the charge on capacitor 91 so that the voltage across the capacitor corresponds to the temperature of motor 20.

A fourth analog input 97 to the microcomputer 60 is connected to the wiper of a potentiometer 96 which is connected between the regulated, positive voltage level Vcc and circuit ground. The setting of potentiometer 96 applies a voltage level to the analog input of the microcomputer which is indicative of the overload motor current level, or threshold, at which the control circuit should trip the contactor 10 to cut off the supply of electricity to the motor 20.

A pair of jumpers 99 (depicted by dashed lines) are connected or disconnected to supply two bits to digital inputs 98 of the microcomputer 60. These bits indicate the class of operation for the overload relay. The class is a standard designation which indicates how long an over current condition must exist before the overload relay 15 cuts off the current to the motor. Since a motor during starting momentarily can draw six times its normal running current, a delay before tripping is essential.

During operation of the control circuit 16, the output relay coil 42 is normally deenergized allowing the second storage capacitor 46 to charge to substantially the full output voltage from the rectifier bridge 30. Upon an overload condition, the first transistor 44 will be turned on, thereby applying the voltage across the second storage capacitor 46 to the coil of the output relay 42 thereby energizing the relay and opening switch contacts 43. This circuit operation will be described in detail subsequently.

As seen from the circuit diagram in FIG. 2, the power for the overload relay control circuit 16 and its microcomputer 60 is derived from the current sensing transformers 21-23 and the rectifier bridge 30, which components also produce a signal indicative of the current level flowing to the motor that is used to determine when a current overload occurs. The control circuit has two modes of operation, one in which the output of the rectifier bridge charges storage capacitors 35 and 46, which supply power to the device, and a second mode in which the voltage across the rectifier terminals 31 and 32 is sensed to detect whether a current overload condition exists.

Figure 3:
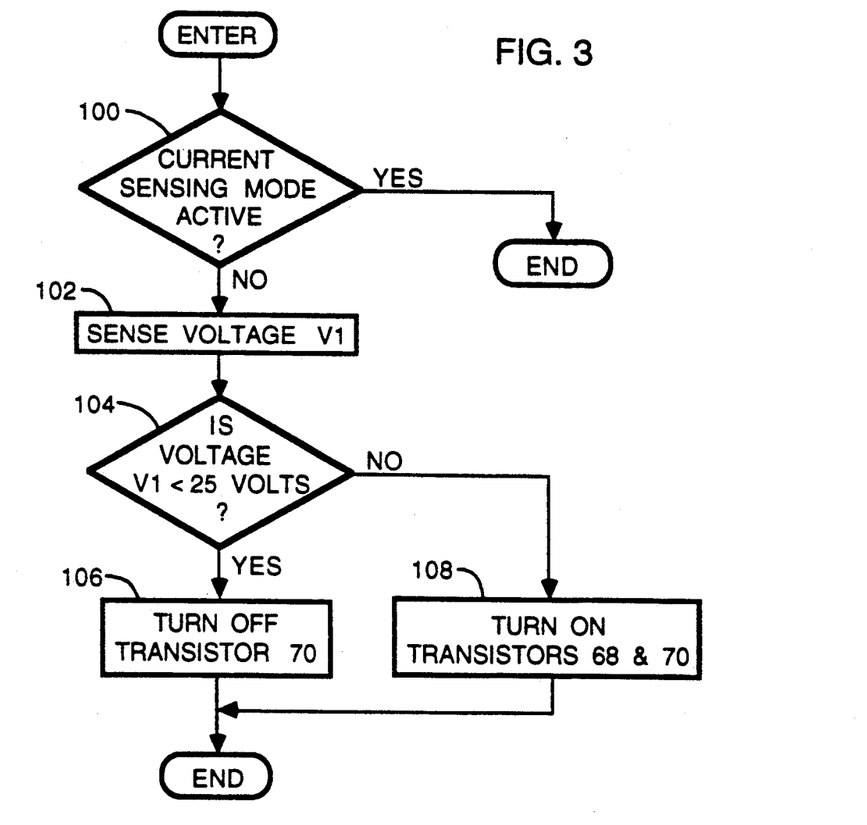
FIG. 3 is a flowchart of a software routine to control the supply of power to the components of the control circuit.

In the power supply mode, the microcomputer 60 senses the voltage $V_1$ across the first storage capacitor 35 every two milliseconds to determine whether the voltage has dropped below a level which is adequate to power the control circuit 16. Voltage $V_1$ is applied across the voltage divider formed by resistors 50 and 52 and produces a proportionally lower voltage at node 51 between those resistors. Every two milliseconds, a real time interrupt within the microcomputer initiates the execution of a power supply control routine which is depicted in the flowchart of FIG. 3. When the two millisecond real time interrupt occurs, the power supply control program enters step 100 where the microcomputer 60 tests a flag which indicates whether the current sensing mode is active. If the supply line current is being sensed, the software routine immediately terminates.

However, if current sensing is not presently being conducted, the program execution advances to step 102 where the microcomputer 60 digitizes the analog signal which it receives at its first analog input connected to node 51. This digitized value indicates the voltage at node 51 which has a known proportionality relationship to the voltage $V_1$ across the first storage capacitor 35. The sensed voltage level then is compared to a reference value at step 104 to determine whether voltage $V_1$ is dropping to a level which is inadequate to supply the voltage regulator 36. For example, the threshold may be set to provide an indication when voltage $V_1$ drops below 25 volts, at which point the first storage capacitor 35 must be recharged.

If the sensed voltage indicates that $V_1$ is below 25 volts, the program branches to step 106 where the fifth transistor 70 is turned off by the microcomputer 60 applying a high logic level to output line 62. This high logic level turns on the sixth transistor 78 which causes the fifth transistor 70 to turn off. With the fifth transistor 70 in the non-conductive state, a relatively high resistance exists across the rectifier bridge output terminals 31 and 32, since resistors 76 and 79 have high resistance values. Therefore, approximately the full output current produced by the rectifier bridge 30 is applied via diodes 34 and 40 to storage capacitors 35 and 46, respectively. In this state, the storage capacitors 35 and 46 begin to charge to a higher magnitude. The program execution of the power supply control routine then terminates until the occurrence of another two millisecond interrupt.

Once the voltage V1 across the first storage capacitor 35 is found at step 104 to equal or exceed 25 volts, the program execution by the microcomputer 60 branches to step 108. At this time, the microcomputer applies a low logic level to output line 62 which turns off the sixth transistor 78, thereby turning on the fifth transistor 70. At the same time, the microcomputer 60 applies a low level to output line 61 turning on the third and fourth transistors 66 and 68. When both these transistors 68 and 70 are conductive, resistor 73 is coupled across the output terminals 31 and 32 of the rectifier bridge 30. Thus, the output current from the rectifier bridge is shunted through the two transistors 68 and 70 and resistor 73 discontinuing further charging of the storage capacitors 35 and 46. In this state, diodes 34 and 40 prevent the corresponding storage capacitors 35 and 46 from discharging through the low resistive path produced by the fourth and fifth transistors 68 and 70 and resistor 73. Thereafter, the execution of the power supply control routine depicted in FIG. 3 ends until the next occurrence of the two millisecond interrupt.

In this fashion, the microcomputer 60 senses the voltage across the first storage capacitor 35 and applies the voltage from the rectifier bridge 30 across that capacitor at selected times to insure that it remains charged to a level which produces approximately 25 volts at the input to voltage regulator 36. This insures that the voltage regulator 36 will have an ample input voltage to provide the regulated supply voltage Vcc for the control circuit.

Figure 4A:
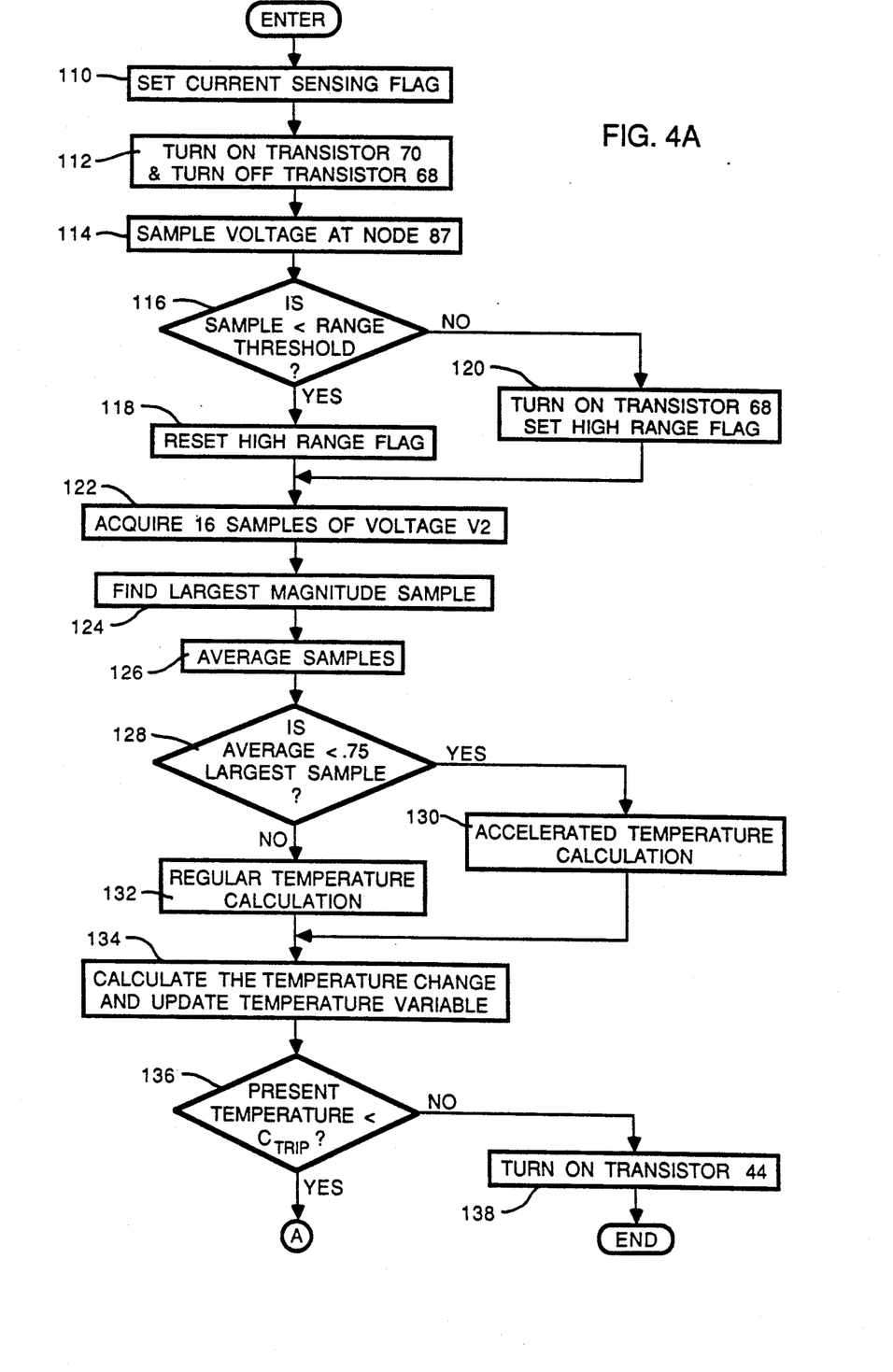
FIGS. 4A and 4B form a flowchart of a software routine which provides current overload detection.
Figure 4B:
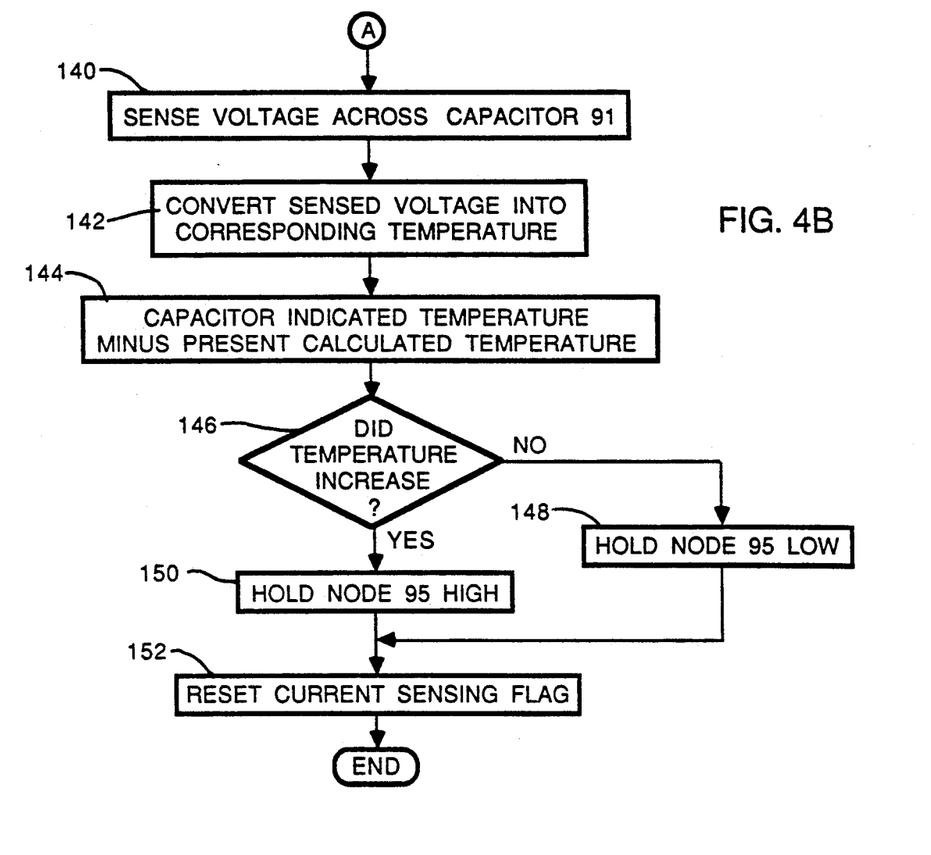

The current sensing mode also is initiated by a timed interrupt every 100 milliseconds. When this interrupt occurs, the current sensing software routine depicted in FIGS. 4A and 4B is executed by the microcomputer 60. This program routine begins at step 110 where a flag is set within the internal memory of the microcomputer to indicate that the control circuit 16 is in the current sensing mode. This flag inhibits the microcomputer from entering the power supply control mode when the two millisecond interrupt occurs and permits the current sensing routine to be executed without interruption by the power supply control routine.

At step 112, the microcomputer applies output signals to lines 61 and 62 which turn on the fifth transistor 70 and turn off the fourth transistor 68. This switching of the transistors couples resistors 73 and 74 across the output terminals 31 and 32 of the rectifier 30. The microcomputer 60 then senses the voltage at node 87 which is produced by the voltage $V_2$ across the switched-in resistors 73 and 74. The voltage $V_2$ is not applied directly to the analog input of the microcomputer 60, but rather is coupled through the network 80 formed by resistors -84 and diode 86. This network 80 prevents too high a voltage from being applied to the analog input of the microcomputer 60. The values of the resistors in network 80 are chosen so that the third diode 86 will conduct current when the voltage at node 85 exceeds a given value, thereby preventing the voltage at node 87 from exceeding the maximum allowable input level for the microcomputer. This level also is stored as a fixed threshold value in the microcomputer's memory.

The microcomputer 60 at step 114 next samples the voltage at node 87. If the voltage sample is less than the input level threshold, the program execution branches to step 118 where a flag is reset to indicate that the control circuit is set in the lower of two sensing ranges.

If the sampled voltage at node 87 is close to the maximum allowable input voltage to the microcomputer, the program execution branches from step 116 to step 120 where the microcomputer via output line 61 turns on the fourth transistor 68. When the fourth transistor 68 is rendered conductive, a shunt path is created around resistor 74, thereby effectively coupling only resistor 73 across the output terminals 31 and 32 of the rectifier bridge 30. The values of resistors 73 and 74 are chosen so that resistor 73 is one-eighth the combined resistance of resistors 73 and 74. As a result, when the fourth transistor 68 is conductive, eight times the motor current magnitude is required to produce the same level of voltage at the microprocessor input 88 as when transistor 68 is turned off and the current flows through both resistors 73 and 74. By controlling the fourth transistor 68, the microcomputer 70 can switch between two different current sensing ranges without exceeding the maximum allowable input voltage of the analog input to microcomputer 60. When the control circuit 16 is in the high sensing range, another flag is set at step 120 to provide an indication of the selected range to subsequent processing steps.

Once the current sensing range has been set, the microcomputer 60 acquires sixteen samples of the voltage at node 87 by taking one sample every millisecond at step 122. Each voltage sample is proportional to the current level flowing to the motor 20 through the primary windings of current sensing transformers 21, 22 and 23. Based on the proportionality and the selected sensing range, the digital value of each sample is converted to a numerical value corresponding to the level of the current. After the acquisition of sixteen samples, the largest magnitude current level sample is found at step 122 before the microcomputer calculates the average of the sixteen samples at step 124.

Thereafter, an analysis is conducted to determine whether an overload condition exists that warrants tripping the output relay 42 to disconnect the power to the motor 20. The overload relay 15 does not trip immediately upon the detection of a current overload, but rather trips only if the overload persists for a period of time. Conventional bi-metallic overload relays are classified by their reaction time to an overload condition. For example, a "class ten device" trips within ten seconds when the motor current is six times (600%) a set overload level, while a class twenty device responds in twenty seconds. The class of the overload relay 15 is selected to match the particular motor's ability to tolerate a current overload and the heat generated by the excessive current. The rate at which heat is produced in the motor is a function of the current magnitude. Thus the motor is able to withstand a relatively small overload current for a greater period of time than a significantly larger current level. As a consequence, the overload relay 15 must trip sooner for greater overload currents in order to prevent thermal damage to the motor. This relationship is graphically depicted in FIG. 5 in which the interval between the initial sensing of the overload condition and when the relay trips is plotted along the abscissa, and the magnitude of the current above the trip threshold is plotted along the ordinate.

The present solid state version of an overload relay has substantially the same trip characteristic as its bi-metallic predecessor. As noted above, the characteristic is determined by the relationship of the motor heating to the magnitude of the overload current. Therefore the temperature of the motor provides a good indication of when the overload relay 15 should trip and disconnect the application of electricity to the motor. Although the temperature could be sensed directly, that requires a sensor mounted in good thermal contact with the motor and connected to the control circuit, which could be some distance away. Instead the microcomputer 60 of the present device is programmed with a routine to calculate the temperature of the motor from the magnitude of the current flowing to the motor 20.

A basic expression for the motor heating is given by:

$$\Delta C = \frac{C_{trip}}{\tau} \left( \frac{i}{i_\mu} \right)^n \Delta t = \frac{C}{\tau} \Delta t \qquad (1)$$

where $\Delta C$ is the change in temperature that occurs during time interval $\Delta t$, $C_{trip}$ is the temperature at which the relay trips and is a constant determined by the relay class, C is the present temperature, $\tau$ is the thermal time constant determined by the trip class of the device, i is the current flowing through the motor, $i_\mu$ is the smallest current that will cause the relay to trip as set by potentiometer 96, and n is a constant which relates the current magnitude to its heating effect. The value of n is determined empirically by measuring motor characteristics. Such measurements indicate that the value of n should be greater than two, preferably in the range 2.20 to 2.78. Conventional bi-metallic relays typically operate as if the value of n was approximately 1.30. As a consequence the present device allows n to be adjusted to provide a closer match to the motor's characteristic.

The above expression can be rewritten as follows:

$$\left(\frac{C_{trip}}{\tau}\right)\frac{\Delta C}{\Delta t} = \left(\frac{i}{i_\mu}\right)^n - \frac{C}{C_{trip}} \quad (2)$$

The first parenthetical value is a constant (K) for a given class of overload relays, which further reduces the expression to:

$$K\frac{\Delta C}{\Delta t} = \left(\frac{i}{i_\mu}\right)^n - \frac{C}{C_{trip}} \quad (3)$$

Figure 5:
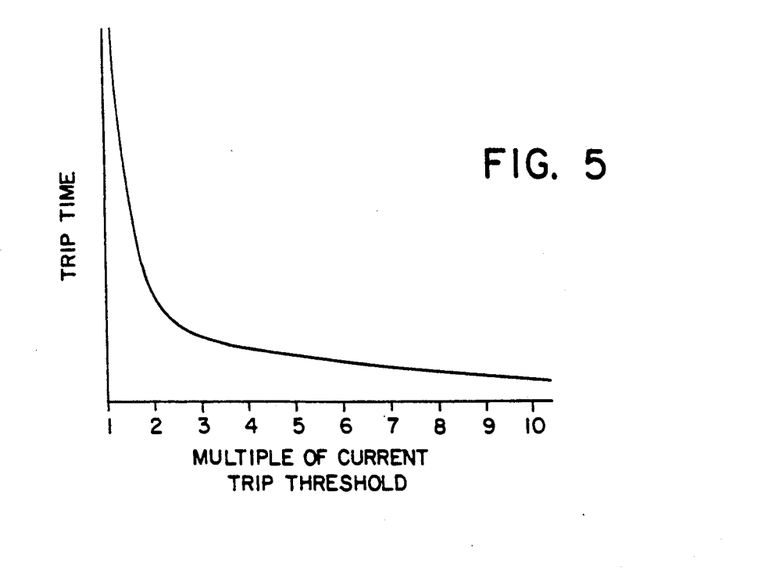
FIG. 5 is a graph of the overload trip time for the control circuit versus the magnitude of the current.

With specific reference again to the flowchart in FIG. 4A, the analysis of the current samples to determine whether an overload condition warrants tripping the relay 42 commences at step 128. Under some circumstances, an imbalance between the three supply phases A, B and C may exist in which a greater amount of current flows through one or two of the supply lines, as compared to the current through the remaining lines. When a phase imbalance exists, the normal trip delay interval must be shortened to cut off the supply of electricity sooner than during a balanced overload condition. In other words, the overload trip characteristic as plotted in FIG. 5 is altered.

At step 128 the microcomputer 60 determines if the average of the sixteen current samples is less than 75 percent of the largest sample. This relationship exists when there a phase imbalance, in which case the program executes step 130 where a third flag is set to indicate hat an accelerated motor temperature calculation routine should be used at a subsequent step. Otherwise the third flag is reset at step 132 to indicate the regular temperature calculation routine should be employed. The routines are similar except that the result ($\Delta C/\Delta t$) is larger for a given overload current level when a phase imbalance exists.

The program execution then advances to step 134 at which point the microcomputer calls the designated motor temperature calculation routine. A variable indicating the motor temperature is stored in the internal memory of the microcomputer 60. After a new set of sixteen current samples has been acquired, the change in temperature per sampling period ($\Delta C/\Delta t$) is derived from equation (3) above. The ratio of the largest sample of motor current (i) to the trip threshold ($i_\mu$), as set by potentiometer 96, is calculated. The result is used to address a look-up table in memory to find the nth power of the normalized current ($i/i_\mu$). The value of the temperature change is added to the variable representing the motor temperature.

Then the value for the temperature ratio $C/C_{trip}$ is L Calculated. The trip temperature ($C_{trip}$) is a constant which is determined by the overload relay class. As a result, the altered value of the motor temperature variable can be used to address a second look-up table to obtain the value of the temperature ratio. This ratio value is subtracted from the motor temperature variable to produce an updated representation of the motor temperature. The result of this arithmetic process is equivalent to calculating the change in temperature per unit of time ($\Delta C/\Delta t$) according to equation (3) and adding the result to the stored motor temperature variable.

The updated motor temperature is compared at step 136 to the temperature at which the trip should occur ($C_{trip}$). If the present motor temperature is not below the trip temperature, the program execution branches to step 138 where the microcomputer 60 forces its output line 63 to a low logic level. This output turns on transistors 48 and 44 applying the voltage across the second storage capacitor 46 to the coil 41 of output relay 44. This causes a current to flow through the coil 41 opening the relay contacts 43 and cutting off the current to the coil 14 of the contactor 10 shown in FIG. 1. With coil 14 deenergized, the sets of contacts 11-13 open, disconnecting the supply of electricity to the motor 20. The output relay 42 in the control circuit of FIG. 2 is a mechanically latching device such that once energized, the contacts 43 remain open until manually reset. Thus, even when the second storage capacitor 46 has discharged and current is no longer flowing through the relay coil 41, the contacts will remain open maintaining the contactor 10 in an open state.

Once the overload relay 15 has tripped, it must be manually reset to close relay contacts 43. When this occurs, the state of switch 19 in FIG. 1 controls whether the contactor 10 remains open or closed.

If the overload relay 15 is not to trip at this time, the program execution advances from step 136 to step 140 on FIG. 4B. This section of the current sensing routine regulates the charge on capacitor 91 to correspond to the present temperature of the motor 20. Since the control circuit 16 is powered via the current sensing transformers 21-23, the indication of motor temperature stored in the volatile memory of the microcomputer 60 is lost once the device trips. To overcome this deficiency, a thermal memory circuit 90 is incorporated to provide a indication of the motor temperature during the tripped state.

While the motor is running, the microcomputer 60 regulates the charge on the capacitor 91 to correspond to the present motor temperature. When a trip occurs the charge decays through resistor 92. The time constant of this decay is chosen to match the cooling characteristic of the motor 20 as is well known. Thus when the relay is reset following an overload trip, the charge on the capacitor 91 will represent the temperature of the motor at that time. When the control circuit 16 is powered up, the microcomputer 60 executes a routine that reads the voltage at node 95 which is determined by the remaining charge on capacitor 91. From this voltage the microcomputer calculates the present motor temperature and stores the result as the initial value of the temperature variable.

Thus an important function of the current sensing routine depicted by FIG. 4B is the regulation of the charge on capacitor 91 to track changes in the motor temperature. At step 140, the voltage across the capacitor 91 is sensed by sensing the voltage at node 95. During this sensing, the microcomputer 60 places output 64 in a high impedance state and senses the node voltage via its third analog input 89. The sensed voltage is converted into the corresponding temperature representation at step 142. The temperature indicated by the capacitor 91 is compared to the value of the motor temperature variable at step 144 and a determination is made at step 146 whether the motor temperature has increased above that indicated by the capacitor 91. If the temperature has increased, the microcomputer 60 forces output 64 high to apply a high logic level to node 95 at step 150. This results in the charge on the capacitor 91 increasing to correspond to the increased motor temperature. If it is determined at step 146 that the motor temperature has not increased (i.e either remained constant or decreased), at step 148 the microcomputer 60 applies a low logic level via output 64 to node 95. This results in the capacitor 91 discharging though resistor 92. Although capacitor 91 discharges even when the motor temperature remains constant, the relatively long RC time constant does not allow significant discharge during the 100 millisecond intervals between execution of the current sensing routine.

After the proper control logic level has been applied to node 95, the program execution advances to step 152. The microcomputer 60 resets the current sensing flag before the routine ends so that the power supply regulation routine will not be inhibited from executing.

I claim:

1. An overload protection device, for controlling the application of multi-phase electric current for a source to a load, comprising
   a switch coupled to the source for selectively connecting the load to the source;
   means for periodically sensing a level of current flowing between the source and the load;
   means for detecting a phase imbalance in the current flowing from the source to the load;
   means, responsive to the sensed level of current and to said means for detecting a phase imbalance, for deriving a change in temperature of the load since a previous sensing of the level of current;
   means for combining the change in temperature with a previous load temperature value to determine the present temperature of the load; and
   means for activating said switch to disconnect the load from the source when the present temperature of the load exceeds a threshold level.

2. An overload protection device, for controlling the application of multi-phase electric current from a source to a load, comprising
   a switch coupled to the source for selectively connecting the load to the source;
   means for periodically sensing a level of current flowing between the source and the load;
   means for deriving a change in temperature of the load since a previous sensing of the level of current by calculating the change in temperature according to the expression:

$$\Delta C = \frac{C_{trip}}{\tau} \left( \frac{i}{i_\mu} \right)^n \Delta t - \frac{C}{\tau} \Delta t$$

where $\Delta C$ is a change in temperature that occurs during time interval $\Delta t$, $C_{trip}$ is a temperature of the load at which the load should be disconnected from the source, C is the temperature of the load, $\tau$ is a thermal time constant, i is the sensed level of current, $i_\mu$ is a constant that defines an overload current level, and n is a relationship constant of the sensed level of current to its heating effect;
   means for combining the change in temperature with a previous load temperature value to determine the present temperature of the load; and
   means for activating said switch to disconnect the load from the source when the present temperature of the load exceeds a threshold level.

3. An overload protection device, for controlling the application of multi-phase electric current from a source to a load, comprising
   a switch coupled to the source for selectively connecting the load to the source;
   means for periodically sensing a level of current flowing between the source and the load;
   means for deriving a change in temperature of the load since a previous sensing of the level of current by calculating the change in temperature per a given time interval ($\Delta C/\Delta t$) according to the expression:

$$K \frac{\Delta C}{\Delta t} = \left( \frac{i}{i_\mu} \right)^n - \frac{C}{C_{trip}}$$

where K is a constant, i is the sensed level of current, $i_\mu$ is a constant that defines an overload current level, C is the present temperature, $C_{trip}$ is a temperature of the load at which the load should be disconnected from the source, and n is a relationship constant of the sensed level of current to its heating effect;
   means for combining the change in temperature with a previous load temperature value to determined the present temperature of the load; and
   means for activating said switch to disconnect the load from the source when the present temperature of the load exceeds a threshold level.

4. An overload protection device, for controlling the application of multi-phase electric current from a source to a load, comprising:
   a switch coupled to the source for selectively connecting the load to the source;
   means for periodically sensing a level of current flowing between the source and the load;
   means for deriving a change in temperature of the load since a previous sensing of the level of current by calculating the change in temperature primarily as a mathematical power function of the presently sensed level of current in accordance with a term:

$$K_1(i)^n$$

where $K_1$ is a constant, i is the sensed level of current and the exponent n is a relationship constant of the sensed level of current to its heating effect;
   means for combining the change in temperature with a previous load temperature value to determine the present temperature of the load; and
   means for activating said switch to disconnect the load from the source when the present temperature of the load exceeds a threshold level.

5. The device of claim 4, wherein the exponent n is within the range 2.20 to 2.78.

6. The device of claim 4 wherein the change in temperature of the load is additionally derived by calculating the change in temperature also as a linear function of the previously calculated temperature in accordance with a term:

$$-K_2 C$$

$K_2$ is a constant and C is the temperature of the load as previously calculated during the last calculation cycle.

7. The device of claim 6, wherein the exponent n is within the range 2.20 to 2.78.

* * * * *